(12) United States Patent
Feris et al.

(10) Patent No.: US 9,736,446 B1
(45) Date of Patent: Aug. 15, 2017

(54) AUTOMATED COLOR ADJUSTMENT OF MEDIA FILES

(71) Applicant: International Business Machines Corporation, Armonk, NY (US)

(72) Inventors: Rogerio S. Feris, Hartford, CT (US); Matous Havlena, Rudoltice (CZ); Minkyong Kim, Scarsdale, NY (US); Ying Li, Mohegan Lake, NY (US); Clifford A. Pickover, Yorktown Heights, NY (US); Valentina Salapura, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/009,140

(22) Filed: Jan. 28, 2016

(51) Int. Cl.
 *H04N 5/225* (2006.01)
 *H04N 9/73* (2006.01)
 *H04N 9/64* (2006.01)

(52) U.S. Cl.
 CPC ............ *H04N 9/735* (2013.01); *H04N 9/643* (2013.01); *H04N 9/646* (2013.01)

(58) Field of Classification Search
 CPC .................................................. H04N 5/23219
 USPC ........................ 348/207.1, 223.1; 382/141
 See application file for complete search history.

(56) References Cited

U.S. PATENT DOCUMENTS

| | | | |
|---|---|---|---|
| 6,875,759 B1 | 4/2005 | Lipkowski et al. | |
| 8,103,094 B2 | 1/2012 | Wilensky | |
| 2002/0057849 A1* | 5/2002 | Senda | G06T 5/50 382/284 |
| 2007/0058858 A1* | 3/2007 | Harville | A45D 44/005 382/165 |
| 2009/0245617 A1* | 10/2009 | Bhatti | G06Q 30/02 382/141 |
| 2013/0027569 A1* | 1/2013 | Parulski | H04N 5/23219 348/207.1 |
| 2013/0162862 A1* | 6/2013 | Zhao | H04N 1/6027 348/223.1 |
| 2016/0027190 A1* | 1/2016 | Minagawa | G06T 7/408 382/167 |

FOREIGN PATENT DOCUMENTS

EP    1771013 B1    9/2011

* cited by examiner

*Primary Examiner* — Joel Fosselman
(74) *Attorney, Agent, or Firm* — Cantor Colburn LLP; Alexa Ashworth

(57) ABSTRACT

An aspect of automated color adjustment of media files includes receiving profile data corresponding to a subject of image capture. The profile data indicates color values of an element associated with the subject. An aspect also includes storing the profile data in a memory device coupled to a computer processor, capturing an image of the subject, and processing the image and adjusting color aspects based on the color values associated with the element.

14 Claims, 2 Drawing Sheets

AUTOMATED COLOR ADJUSTMENT OF MEDIA FILES

BACKGROUND

The invention relates generally to image processing, and more specifically, to automated color adjustment of media using profile colors as a reference.

Photos are taken under different lighting conditions. Typically, the color temperature of photos is adjusted during a post-processing step. Ensuring that the color is correct is often implemented using what are known as professional "gray cards" to serve as the reference color by which other colors in an image are measured. Photographers take a photo with a gray card under the same lighting conditions as the rest of the photos in a session, and then se the photo of the gray card to adjust the color temperature of all of the photos. This is possible because the system knows what color the standard gray card should be.

SUMMARY

According to an embodiment a method, system, and computer program product are provided for automated color adjustment of media. A method includes receiving, by a computer processor, profile data corresponding to a subject of image capture. The profile data indicates color values of an element associated with the subject. The method also includes storing the profile data in a memory device coupled to the computer processor, capturing an image of the subject, and processing the image and adjusting color aspects based on the color values associated with the element.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, which:

DETAILED DESCRIPTION

Exemplary embodiments provide automated color adjustment of media files. The media files may be still images and/or videos. The automated color adjustment processes may be based on a profile, which can include the skin color of an image subject or a favorite earring used as a color standard). Also, for example, if a person or professional model often wears a common object such as eye glasses or earrings, these accessories could broadcast their true color values (e.g., via RFID or other technology). A service may be used to manage the registrations, data flows, and other aspects to embody these concepts. In addition, one or more relevant light sources may also broadcast relevant image curve/temperature/spectral characteristics, etc.

Thus, in lieu of using gray cards as a reference point for color adjustments, the automated color adjustment processes can make automatic the color correction based on a profile. For example, if the profile relates to a person, the reference element used may include skin tone, eye color, and/or a favorite article of clothing, jewelry or accessory. A user may register color data for these elements in a database such that the processes can apply the color data from these items in the implementing color adjustments to an image. In an embodiment, the items themselves may broadcast their color data to a receiving device, such as a camera device, other image or video capturing device, and/or computer system. The user may upload a picture for use as a color base line. A service may be used to manage the registrations, data flows, and other aspects.

Figure 1:
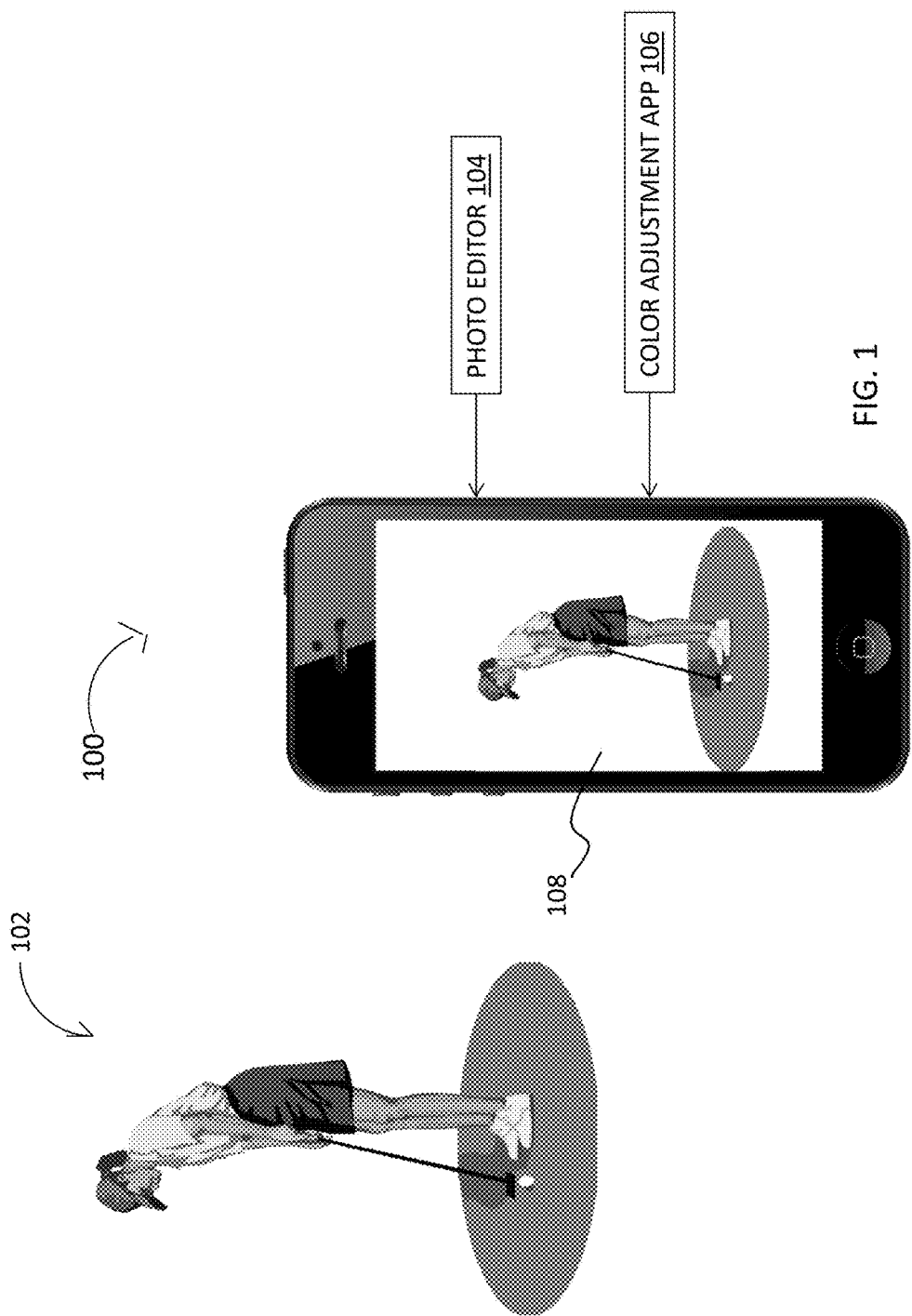
FIG. 1 depicts an image capturing device upon which automated color adjustment processes may be implemented in accordance with an embodiment of the invention.

The automated color adjustment processes may automatically identify the items in the user's profile from the image/photo, e.g., via image recognition techniques. Then, using the reference color information for the identified items, the photo editing tools or camera can correct images. As shown in FIG. 1, an image capturing device 100 is a smart phone with camera capabilities. The device 100 includes a photo editor application 104 and a color adjustment application 106; however, it will be understood that the color adjustment application 106 may be integrated with the photo editor application 104, e.g., as a plug-in. A subject image, shown in FIG. 1 as a golfer, may use, e.g., a red hat as a reference element. The image capturing device 100 captures the image 108 of the golfer, as shown in a screen of the device 100 in FIG. 1.

In an embodiment, the element itself (e.g., red hat) may broadcast its color data to the device 100. Additionally, or alternatively, the reference element may broadcast the color information or color curve to the device 100. The device 100 receives this information and embeds it into the photo data captured. Image processing tools may extract this information and make a color correction.

In an embodiment, rather than an article of clothing or accessory, a light source can broadcast the color information/color curve to the device 100.

An incorrect color issue can be categorized into two sub categories. In a first category, the issue is correcting the photos whose color curve of the photo is in the right shape (similar to color curve for the natural light), but the curve has been shifted to an incorrect temperature. If the color curve's shape is correct, it is relatively easy to fix. The automated color adjustment processes can detect the right amount of the shift in the color temperature and shift the color curve to the correct color temperature. Then, the resulting image will look similar to a photo taken under natural light. The 'right' amount of shift can be determined from the profile data.

The second category can be more challenging to solve. In this scenario, the photo is not taken under natural light but is taken under a light whose color curve is different from that of natural light. In this case, shifting the color curve to the right temperature may not make the photo look like it was taken under natural light. However, as people tend to be much more sensitive to the skin color (or face color) than the color of other objects, correcting color of photos based on the user's profile such as skin tone would provide a good color corrected version of the photo. If the color curve of the particular lighting source is available, the system can also correct the shape of the color curve of the photo. Note that some users may prefer to keep a photo so it shows that it was taken under a warm light source (typically an indoor setting)

rather than under natural light. Thus, the exemplary system provides the corrected version of the photo.

The exemplary processes may leverage information received from a smart bulb in the room where the picture is taken. Digital cameras/smartphones can receive bulb specific information such as color temperature, manufacturer, watts, color, illumination intensity and other data. Information such as this can be used to identify the type of a light bulb (e.g., low pressure lamps, studio lamp, fluorescent lamps, xenon lamps, etc.) and can be later leveraged when doing color adjustments of photos. Digital cameras and smartphones can receive the bulb specific information through WI-FI, BLUETOOTH, or other wireless technologies. BLUETOOTH and GPS can be used to locate the closest light bulbs when the picture is taken.

In one embodiment, the process for performing automated color adjustment processes will now be described. The process may begin as a user provides a reference element to the system (e.g., data indicating a skin tone). The user may either choose the best matching color from a set of color patches or an arbitrary color from the color wheel or other color palettes. The person may also provide their hair color or any other colors of their profile in a similar manner. The items used in the profile do not have to be biometric color. For example, a favorite pair of earrings that is worn frequently can be registered for inclusion in the profile.

If the user owns a gray card, the user can take a photo of the skin with the gray card. Then, the system can process the photo and create the profile of the user, recording the reference skin tone for this user. If the user does not own a gray card but has a smartphone, the user can turn on the flash light of the phone and take the photo of the skin. The system has the color profile of the flash light, provided by the manufacturer. Using the color profile of the given flash light, the system can extract the true skin tone of the user.

If the user has neither a gray card or smartphone with flash light, the user can choose the best matching color from the color patches provided on a screen of a computer or mobile device by visually comparing it against his/her real skin tone.

The color temperature of a photo can be automatically adjusted based on the true color of the user's skin tone, hair color, etc.

Active Broadcasting of Color Profile.

Instead of using only the profile items identified in the photo through image processing, the exemplary processes include the ability to broadcast color information. The image capturing device captures this information and adds it to the metadata of images. This metadata can be associated with the already existing metadata created by the device itself. The information may include the date and time when the photo was taken, as well as camera settings (e.g., F-stop, focal length, etc.) under which the photo was taken. For every pair of images containing the original and corrected versions (e.g., denoted by J and J'), they may be saved in the memory of the device or on some remote device or database server, along with the used correction function. Once these pairs have been collected as a sizeable number, they may be leveraged for color correction. Specifically, given an image newly taken (e.g., J0), the image collection may be searched, and or original image (e.g., K) may be identified, which presents similar color temperature curve as that of J0. Then, the color correction function of K is retrieved, which has converted K to K', and apply such function to J0 to obtain J0'. J0' in this case would be the image with a corrected color temperature.

The image pair database could potentially include all pairs analyzed and its size would apparently keep increasing. To avoid maintaining any redundant information or to save memory, a limited number of image pairs may be kept for each type of correction function. Applying this matching-based approach can speed up the color correction process and avoid any manual interaction of color adjustment.

Figure 2:
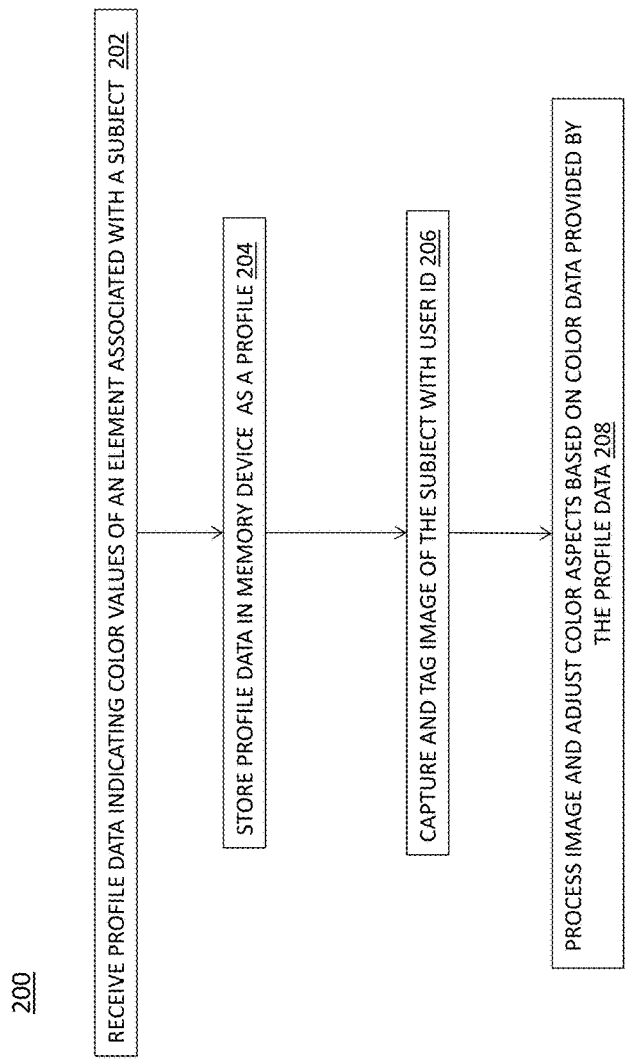
FIG. 2 depicts a flow diagram of a high-level process for automated color adjustments of media files in accordance with an embodiment of the invention.

Turning now to FIG. 2, a process for implementing the automated color adjustment processes will now be described in an embodiment. In block 202, the device 102 receives a reference element corresponding to a subject image of capture. In block 204, the reference element is stored as a profile.

In block 206, an image is captured and tagged with an identifier of a user that provided the reference element. In block 208, the image is processed and the color is adjusted based on color data provided by the reference element.

Technical effects and benefits include automated color adjustment of media files. The automated color adjustment processes may be based on a profile, which can include the skin color of an image subject or a favorite earring used as a color standard). A service may be used to manage the registrations, data flows, and other aspects to embody these concepts. In addition, one or more relevant light sources may also broadcast relevant image curve/temperature/spectral characteristics The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented matched-based color correction method for automated color adjustment of a first image comprising a subject, the computer implemented matched-based color correction method executed by a computer processor, the computer implemented matched-based color correction comprising:
   automatically identifying the subject of the first image;
   receiving, by the computer processor, profile data corresponding to the subject of the first image, the profile data indicating color values of a reference element associated with the subject, the color values of the reference element representing a set of reference values;
   automatically storing the profile data in a memory device coupled to the computer processor prior to capturing the first image;
   capturing the first image;
   tagging the first image with an identifier;
   comparing the color values of the reference element, as a base of reference via the set of reference values, to color aspects of the first image; and
   performing the automated color adjustment of the color aspects of the first image based on the color values associated with the reference element,
   wherein the performing the automated color adjustment of the color aspects of the first image based on the color values associated with the reference element comprises:
      searching an image collection for a second image that presents a similar color temperature curve as that of first image,
      retrieving a color correction function of the second image from an image pair database, and applying the color correction function of the second image to the first image to generate a derivative first image comprising a corrected color temperature, wherein applying of the color correction function of the second image comprises comparing a color curve on the first image to a color patch in the profile data and determining a difference in values between the color curve and the color patch, the difference in values representing color correction information, wherein the image pair database stores a limited number of image pairs per type of correction function to avoid maintaining any redundant information, save memory, and implement the computer implemented matched-based color correction method, and wherein the receiving profile data includes receiving, from a light source, temperature data and spectral characteristics corresponding to a light provided by the light source.

2. The method of claim 1, wherein the reference element is an article placed with the subject during the capturing of the first image.

3. The method of claim 1, wherein the color values reflect a skin tone of the subject.

4. The method of claim 1, wherein the reference element is an accessory of the subject and the color values indicate color data associated with the accessory.

5. The method of claim 1, wherein the reference element is an accessory of the subject and the color values indicate color data associated with the accessory, wherein the receiving the profile data includes receiving the color values broadcast from a wireless communication component of the accessory.

6. The method of claim 1, wherein the reference element is an accessory of the subject and the color values indicate color data associated with the accessory, wherein the receiving the profile data includes scanning an RFID tag of the accessory to acquire the color data of the accessory.

7. The method of claim 1, where the profile data contains multiple sets of color values selectable by a user for the first image.

8. A system for automated color adjustment of an image comprising a subject, the system comprising:
    a memory having matched-based color correction computer readable instructions; and
    a processing unit for executing the matched-based color correction computer readable instructions, the computer readable instructions including:
        automatically identifying the subject of the first image;
        receiving profile data corresponding to the subject of the first image capture, the profile data indicating color values of a reference element associated with the subject, the color values of the reference element representing a set of reference values;
        automatically storing the profile data in the memory prior to capturing the first image;
        capturing the first image;
        tagging the first image with an identifier;
        applying the color values of the reference element, as a base of reference via the set of reference values, to color aspects of the first image; and
        performing the automated color adjustment of the color aspects of the first image based on the color values associated with the reference element,
    wherein the performing the automated color adjustment of the color aspects of the first image based on the color values associated with the reference element comprises:
        searching an image collection for a second image that presents a similar color temperature curve as that of first image,
        retrieving a color correction function of the second image from an image pair database, and
        applying the color correction function of the second image to the first image to generate a derivative first image comprising a corrected color temperature,
    wherein applying of the color correction function of the second image comprises comparing a color curve on the first image to a color patch in the profile data and determining a difference in values between the color curve and the color patch, the difference in values representing color correction information,
    wherein the image pair database stores a limited number of image pairs per type of correction function to avoid maintaining any redundant information, save memory, and implement the matched-based color correction computer readable instructions, and
    wherein the receiving profile data includes receiving, from a light source, temperature data and spectral characteristics corresponding to a light provided by the light source.

9. The system of claim 8, wherein the reference element is an article placed with the subject during the capturing of the first image.

10. The system of claim 8, wherein the color values reflect a skin tone of the subject.

11. The system of claim 8, wherein the reference element is an accessory of the subject and the color values indicate color data associated with the accessory, wherein the receiving the profile data includes receiving the color values broadcast from a wireless communication component of the accessory.

12. The system of claim 8, wherein the reference element is an accessory of the subject and the color values indicate color data associated with the accessory, wherein the receiving the profile data includes scanning an RFID tag of the accessory to acquire the color data of the accessory.

13. A computer program product for automated color adjustment of an image comprising a subject, the computer program product comprising a non-transitory computer readable storage medium having matched-based color correction program instructions embodied therewith, the program instructions executable by a computer processor to cause the computer processor to perform:
    automatically identifying the subject of the first image;
    receiving profile data corresponding to the subject of the first image, the profile data indicating color values of a reference element associated with the subject, the color values of the reference element representing a set of reference values;
    automatically storing the profile data in a memory device coupled to the computer processor prior to capturing the first image;
    capturing the first image;
    tagging the first image with an identifier;
    applying the color values of the reference element, as a base of reference via the set of reference values, to color aspects of the first image; and
    performing the automated color adjustment of the color aspects based on the color values associated with the reference element, wherein the performing the automated color adjustment of the color aspects of the first image based on the color values associated with the reference element comprises:
  searching an image collection for a second image that presents a similar color temperature curve as that of first image,
  retrieving a color correction function of the second image from an image pair database, and
  applying the color correction function of the second image to the first image to generate a derivative first image comprising a corrected color temperature,
wherein applying of the color correction function of the second image comprises comparing a color curve on the first image to a color patch in the profile data and determining a difference in values between the color curve and the color patch, the difference in values representing color correction information,
wherein the image pair database stores a limited number of image pairs per type of correction function to avoid maintaining any redundant information, save memory, and implement the matched-based color correction program instructions, and
wherein the receiving profile data includes receiving, from a light source, temperature data and spectral characteristics corresponding to a light provided by the light source.

14. The computer program product of claim 13, wherein the reference element is an accessory of the subject and the color values indicate color data associated with the accessory, wherein the receiving the profile data includes receiving the color values broadcast from a wireless communication component of the accessory.

* * * * *